Dec. 27, 1966 R. W. BROWN 3,295,079
SOLENOID ACTUATOR ASSEMBLY HAVING A UNITARY
SPRING CLIP FOR THE PLUNGER
Filed Dec. 3, 1964 2 Sheets-Sheet 1

INVENTOR.
RICHARD W. BROWN
BY
Alan M. Staubly
ATTORNEY

Dec. 27, 1966  R. W. BROWN  3,295,079
SOLENOID ACTUATOR ASSEMBLY HAVING A UNITARY
SPRING CLIP FOR THE PLUNGER
Filed Dec. 3, 1964  2 Sheets-Sheet 2
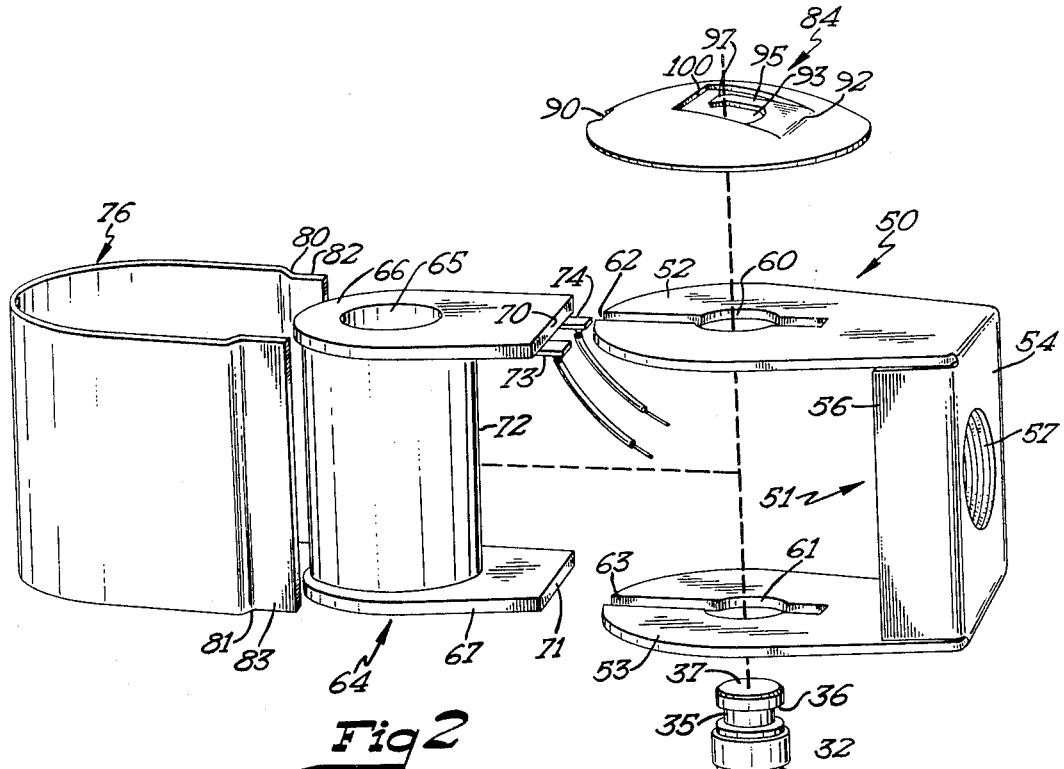
Fig 2
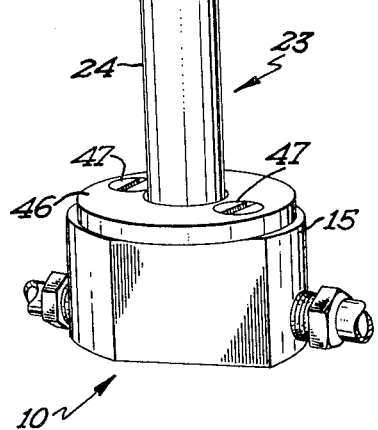
INVENTOR.
RICHARD W. BROWN
BY
Alan M. Staubly
ATTORNEY

United States Patent Office 3,295,079
Patented Dec. 27, 1966

3,295,079
SOLENOID ACTUATOR ASSEMBLY HAVING A UNITARY SPRING CLIP FOR THE PLUNGER
Richard W. Brown, Excelsior, Minn., assignor to Honeywell Inc., Minneapolis, Minn., a corporation of Delaware
Filed Dec. 3, 1964, Ser. No. 415,614
7 Claims. (Cl. 335—255)

This invention relates to control apparatus and, more specifically, to an improved solenoid actuator assembly for controlling the operation of a device such as a valve, switch, or the like. It relates also to the combination of this improved solenoid actuator with a fluid control valve. Further, the invention relates to an improved unitary spring clip which is used in combination with other elements of the assembly to secure those elements in assembled relationship.

With the advance in technology in recent years there has come an ever increasing demand for more compact and more reliable solenoid actuators and solenoid actuated devices. Obviously, it is desirable that such actuators be as inexpensive as possible. Inexpensive solenoid actuators which are not fully enclosed can often be used in applications where the actuator is mounted within an exterior housing of the machine or appliance on which the actuator is used. This is true, for example, in the case of solenoid valve actuators for appliances such as automatic dishwashers and clothes washing machines. However, when the actuator is to be used in an application where an exterior housing will not be provided, it is generally required that the actuator itself include a structure for enclosing the coil assembly and the electrical connections for the actuator. Generally this has been accomplished by utilizing an inverted cup-shaped member which fits directly over the actuator, generally co-axial with the plunger tube of the actuator, and is secured to the plunger tube by a fastening means such as threaded nut.

By the present invention I have provided an actuator assembly formed of a plurality of inexpensive interlocking parts which provides an enclosure for the solenoid actuating coil and the electrical connections thereto, but which results in a substantial cost reduction over the actuator assemblies used heretofore. My improved assembly is quickly and easily assembled or disassembled without the use of expensive or complicated tools. My invention further provides a unitary spring clip which is utilized to secure the interlocking parts in assembled relationship and which, when it is in assembled position, provides a locking function to prevent accidental disassembly of the unit but which, by a simple manipulation, can be easily removed to render the unit easily disassembled without destroying the clip. My invention further contemplates the combination of the improved actuator assembly with a solenoid actuated valve of the type having an upstanding plunger tube assembly extending therefrom and with the actuator assembly mounted upon the plunger tube assembly. By the use of my invention the solenoid valve is rendered easily assembled in manufacture and easily disassembled for service when it is installed for use in the control of fluid flow.

Therefore, an object of my invention is to provide an improved solenoid actuator assembly which is constructed of a plurality of interlocking parts each of which is relatively simple and inexpensive to manufacture and wherein the parts are simply and easily assembled to effect a substantial cost reduction over prior actuators of this type.

Another object of my invention is to provide an improved unitary spring clip for securing assemblies, such as a solenoid actuator assembly.

A further object of my invention is to provide a spring clip of the type described above which locks in place when the unit is assembled to prevent accidental disassembly thereof but which is removable by a simple manipulation thereof without destruction of the clip.

Still another object of my invention is to provide a solenoid actuator assembly utilizing a spring clip of the type described above to secure the assembly and render the assembly quickly and easily assembled and disassembled.

A still further object of my invention is to provide an improved solenoid valve assembly utilizing the improved solenoid actuator assembly described to render it quickly and easily assembled and disassembled to reduce the cost of manufacture and maintenance.

These and other objects of my invention will become apparent upon reading the following description of a preferred embodiment thereof and with reference to the drawing wherein:

FIGURE 2 is an exploded perspective view of the solenoid valve of FIGURE 1, particularly disclosing the interlocking components of my improved actuator assembly;

Figure 1:
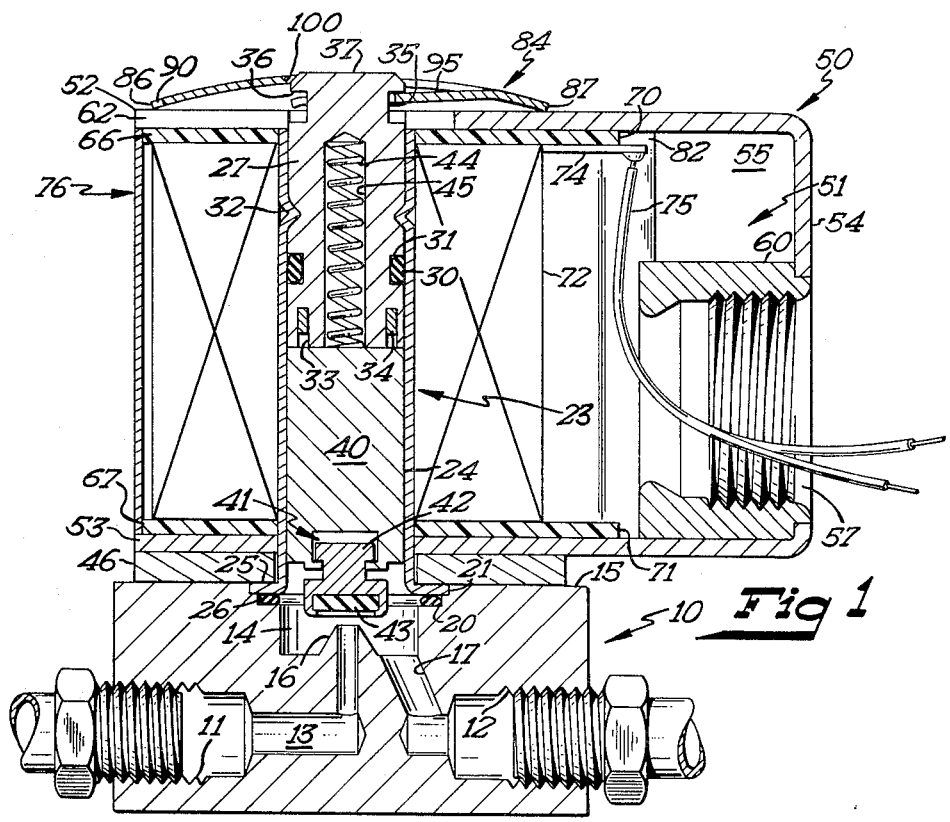
FIGURE 1 is a vertical cross sectional view taken through the center of a solenoid valve utilizing the improved actuator assembly of my invention.

Referring to FIGURES 1 and 2, reference numeral 10 designates a valve body having an inlet port 11 and an outlet port 12. An inlet passage 13 extends from port 11, makes a right angle and extends upward to a generally circular valve chamber 14 which is adjacent the upper surface 15 of the valve body. Surrounding passage 13, in the chamber 14, is an annular valve seat 16. An outlet passage 17 connects chamber 14 to the outlet port 12. Surrounding the chamber 14 and co-axial therewith is an annular recess 20 in valve body 10. Adjacent the surface 15 of valve body 10 is a second annular recess 21 which is co-axial with recess 20 and chamber 14 but having a greater outer diameter than the recess 20. Thus, the recesses 20 and 21 provide a generally annular stepped arrangement adjacent the upper surface 15 of valve body 10. Mounted on the valve body is a plunger tube assembly 23 which includes a relatively thin walled hollow tube 24 having a radial flange 25 at the inner end thereof. Flange 25 is adapted to fit into the annular groove 21 in the valve body and is sealed with respect thereto by an O-ring 26 which is mounted in the annular recess 20.

At its outer end, tube 24 has mounted therein a plunger stop 27, the major part of which is mounted inside of tube 24. The plunger stop is sealed with respect to the tube by an O-ring 30 which is mounted in an annular groove 31 in the plunger stop and which is squeezed between the groove and the inner walls of tube 24 to provide a tight seal. Plunger stop 27 also has a V-shaped annular groove 32 into which the tube 24 is rolled to provide a clamping arrangement to secure the plunger stop and tube together. The plunger stop 27 may also have formed therein, on its inner end, within the tube 24, an annular groove 33 in which is mounted a shading ring 34. Plunger stop 27 has anouter end extending above the outer extremity of tube 24 and has an annular groove 35 formed therein adjacent the outer end. The upper periphery 36 of this groove provides an abutment surface which acts as an annular retaining flange which co-acts with a fastening member to be described hereinafter. The outer end of plunger stop 27 may be beveled to give the outer end of the plunger tube assembly the appearance of a truncated cone as indicated by numeral 37. This improves the appearance of the structure and aids in assembly.

Mounted within plunger tube 24, and axially movable therein, is a solenoid plunger 40. Mounted on the inner end of the plunger, preferably by a lost motion connection as shown at 41, is a valve member 42 which is cooperable with valve seat 16 to control the flow of fluid through the valve. Valve member 42 preferably has a seating member 43 which may be formed of rubber or other similar material to provide a good seal with the valve seat. Mounted between the plunger stop 27 and the plunger 40 is a biasing spring 40 which urges the plunger toward the valve body and consequently urges the valve member 42 into engagement with seat 16. In the preferred embodiment I have chosen to mount the spring in an opening 45 in the plunger stop 27, but it is to be understood that the opening may be provided in the plunger itself and the spring merely abut the plunger stop.

An apertured clamping ring 46 encircles the plunger tube 24 and engages the upper surface of the radial flange 25 thereon. Clamping member 46 is attached to body 15 by appropriate means such as screws 47 (see FIGURE 2) and urges the flange 25 into annular groove 21 and into engagement with the O-ring 26 to provide a fluid tight seal therebetween and to rigidly mount the plunger tube assembly on the valve body. Clamping member 46 thus acts as a cover member forming a part of the valve body 10 and the upper surface thereof provides an abutment surface for the solenoid actuator assembly which will be described hereinafter.

Mounted on the plunger tube assembly is a frame member 50 which has a generally cup-shaped enclosed rear portion 51 having extending therefrom, on opposite sides thereof, a pair of spaced, parallel, flat legs 52 and 53. In a preferred embodiment the frame member 50 is stamped from a flat piece of magnetic material and the legs 52 and 53 are joined at their rear ends by a bight portion 54 and the cup portion is completed by a pair of wings 55 and 56 struck forward from opposite sides of the bight portion and extending intermediate the legs 52 and 53. Bight portion 54 is provided with an aperture 57 through which electrical conductors may extend. The aperture 57 may be fitted with a threaded conduit connector 60 which is attached to the bight portion by appropriate means such as the braizing (not shown) with the connector 60 mounted within the cup portion of the frame member.

The legs 52 and 53 are identical to each other and each is symmetrical about a center-line extending from front to rear and each has a forward end portion which preferably takes the shape of a semi-circle. The side edges of the two legs extend backward from a point tangential to the semi-circular forward portion and extend to the forward edge of the cup-shaped portion. At the center of curvature of the forward portion are formed apertures 60 and 61 in legs 52 and 53 respectively. The apertures 60 and 61 are of substantially the same diameter as the plunger tube assembly 23 so that the plunger tube assembly extends through the apertures with the bottom surface of leg 53 engaging the upper surface of clamping member 46.

While the frame member has been described as stamped from a piece of sheet metal with a cup-shaped portion being formed by striking forward the wings 55 and 56, it is to be understood that the frame member may be formed in some other manner without departing from the present invention. For example, the frame member may be a drawn part with the legs 52 and 53 extending forward from the cup-shaped portion and co-extensive with the two opposed sides thereof. However, the arrangement disclosed in the drawing and described above has been chosen as a preferred embodiment since it has been found to provide a ridged structure with satisfactory magnetic characteristics, provides a pleasing appearance and is simple and relatively inexpensive to manufacture. The particular material used for the frame member 50 is not important but is to be understood that it must be formed of a magnetic material since it obviously forms a portion of the magnetic path for the solenoid actuator. In order to improve the magnetic characteristics of the device, it has been found desirable to include slots 62 and 63, in legs 52 and 53, respectively, extending generally along the line of symmetry of the legs and extending from the front edge to a point intermediate the aperture through the legs and the forward portion of cup-shaped portion 51 of the frame member.

It is also to be understood that, while the preferred embodiment of the frame member has the forward portion of the legs formed as a semi-circle, this configuration is not absolutely necessary. It is desirable for the reason that it improves the aesthetic qualities of the structure and results in ease of manufacture, but obviously the forward portion could be formed with some other configuration without departing from the scope of my invention.

Mounted between the legs 52 and 53 is a bobbin 64 which has an aperture 65 extending therethrough from top to bottom. This aperture 65 has substantially the same diameter as the diameter of plunger tube assembly 23 so that the bobbin may be mounted on the plunger tube assembly. In addition to the apertured central portion of the bobbin, it also includes a pair of parallel end members 66 and 67 which, when the unit is assembled, are disposed adjacent legs 52 and 53 of the frame portion, respectively. These end members 66 and 67 are formed with a shape similar to that of the leg portions of the frame member but slightly smaller than the legs (see FIGURE 1) for purposes which will become clear hereinafter. For example, in the preferred embodiment, each of the end members of the bobbin has a forward portion formed in the shape of a semi-circle and the aperture 65 extends through the bobbin substantially at the center of curvature of these forward portions. The side edges of the end members extend rearwardly from a point generally tangential to the semi-circular forward portion and terminate in a rear surface 70 and 71 on members 66 and 67 respectively, which extend transverse to the axis of symmetry of the legs and of the end members of the bobbin. When the bobbin is mounted in the frame member, which is in turn mounted on the plunger tube assembly 23, the rear end portions 70 and 71 of bobbin 64 are disposed slightly forward of the forward or open edge of the cup-shaped portion 51 of the frame member.

Mounted on the bobbin 64 is a solenoid coil 72. Upper end member 66 of the bobbin may have mounted thereon by appropriate means (not shown) a pair of terminal members 73 and 74 which are connected to the coil 72 and which provide a means for attaching appropriate conductors 75 (one of which is seen in FIGURE 1) to the coil.

Enclosing the front and side portions of the bobbin 64 is a member 76 which I have chosen to refer to as an enclosure member. This member is formed from a strip of relatively thin material such as metal or plastic and having a thickness approximately equal to the difference in dimension between the legs 52 and 53 of the frame member and the end mambers 66 and 67 of the bobbin. Enclosure member 76 has a width which is substantially equal to the distance between the legs 52 and 53 and is formed with a curvature substantially equal to that of the forward portion of the end members 66 and 67 of the bobbin. Adjacent each end thereof, member 76 has an in-turned flange. These flanges are denoted by the numerals 80 and 81 on opposite sides of the member. Adjacent the in-turned flanges 80 to 81, are out-turned or rearwardly extending flanges 82 and 83 respectively.

When the unit is assembled, enclosure member 76 fits tightly about the end members of bobbin 64 and between the legs 52 and 53. The in-turned flanges 80 and 81 extend between the rear end portions 70 and 71 of the bobbin and the forward portion of the wings 55 and 56 of the frame member 50. The out-turned flanges 82 and 83 extend rearward along the interior surface of the wings 55 and 56 respectively. In other words, in-turned flange 80 is disposed between the end surfaces 70 and 71 of the bobbin and the forward edge of wing 55 and out-turned flange 82 extends rearwardly along the interior surface of wing 55 and preferably the parts are so constructed that actually flange 82 would be frictionally engaging the interior surface of wing 55. Similarly, in-turned flange 81 is disposed between end portions 70 and 71 of the bobbin and the forward edge of wing 56 of the frame member and out-turned flange 83 extends along the interior surface of wing 56. Thus, the enclosing member 76 is entrapped between the rear portion of bobbin 64 and the forward end of the cup-shaped portion 51 of the frame member.

When the enclosure member 76 is mounted in the manner discussed above, it provides a complete enclosure for the solenoid coil which is substantially continuous with the cup-shaped portion 51 and these two elements together provide an enclosure substantially completely enclosing the coil 72 and the electrical connections thereto. Obviously enclosure member 76 may be painted, anodized, or otherwise finished in order to give the desired appearance to the assembly.

Figure 3:
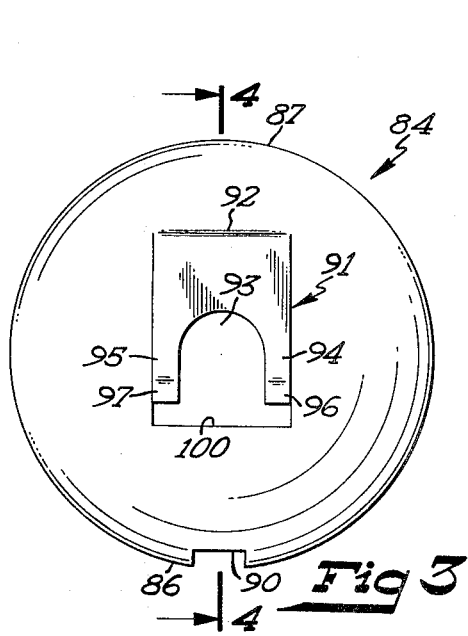
FIGURE 3 is a top view of a unitary spring clip which forms a part of my invention.
Figure 4:
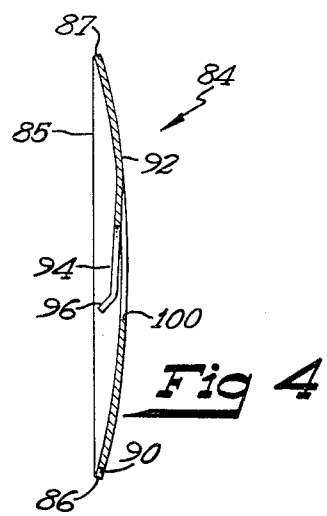
FIGURE 4 is a vertical cross sectional view of the spring clip taken generally along lines 4—4 of FIGURE 3.

When the frame member 50 is mounted on the plunger tube assembly, leg 53 engages the upper surface of the body 10, that is the cover or clamping member 46, and the abutment flange 36 of the plunger tube assembly is disposed slightly above the upper surface of leg 52 of the frame member. The distance between flange 36 and the upper surface of leg 52 is not particularly critical but suffice it to say that the flange is disposed immediately above leg 52. Co-acting with flange 36 and the upper surface 52 of the frame member, to secure the assembly, is a unitary spring clip 84. In my preferred embodiment, the spring clip is a generally dome-shaped member which has a generally circular base portion 85 (see particularly FIGURES 3 and 4). The clip can best be described by defining it as having front and rear edges 86 and 87, respectively, on the base portion for purposes which will be described hereinafter. Front portion 86 preferably has a small notch 90 formed therein. In this preferred embodiment the diameter of the clip is preferably substantially equal to the diameter of the semi-circular portion of the legs 52 and 53 of the frame member. Formed from a part of the crest portion of the dome-shaped member is a yoke designated by the numeral 91. Yoke 91 is severed from the clip member along its forward portion, for example along the forward edge of the yoke as well as along the two sides thereof but is integral with the clip along a line 92 which is located intermediate the center of the clip and the rear edge 87. Yoke 91 has a portion removed at its forward end to define an opening 93 with a pair of spaced forwardly extending fingers 94 and 95 disposed on opposite sides thereof. Clip 84 is formed of a resilient material so that the forward end of yoke member 91 may be depressed. The yoke may be downwardly struck from the crest of the dome-shaped member to a point where it extends substantially parallel to the base 85 thereof. Also, fingers 94 and 95 may have downwardly struck portions 96 and 97 respectively, adjacent their forward ends, which act as guide members for the fingers. These guide members 96 and 97 are preferably struck down so as to form an obtuse angle with the bottom surface of the fingers.

When the clip is mounted on the actuator assembly, the forward end of yoke 91 is depressed slightly and guide members 96 and 97 are inserted under abutment flange 36 and on opposite sides of the plunger tube assembly, in the groove 35 thereon. As the clip is slid forward on the assembly, the fingers 94 and 95 bear upward on abutment flange 36 and the circular base 85 of the clip bears downward on the upper surface of leg 52 of the frame member. The opening left by the depression of the forward portion of yoke 91 must be sufficiently large so that the outer end of the plunger tube assembly can extend therethrough as the clip is slid onto the assembly. When the clip is completely in place on the assembly, the outer end of the plunger tube assembly extends through the opening left by the depression of the yoke 91. At this point the clip is able to snap down so that the entire base 85 engages the upper surface of leg 52 and also, at this time, the clip is locked in place due to the fact that the upper end of plunger tube assembly 23 extends through the aforesaid opening in the clip. The clip cannot be inadvertently or accidentally removed since any attempt to slide it rearwardly results in a surface 100, at the forward edge of the opening in the clip, abutting this upper end of the plunger tube assembly. However, the clip can be readily removed by simply lifting the forward edge thereof, for example by inserting a screwdriver in the notch 90 and lifting, so that the surface 100 clears the upper end of the plunger tube assembly. Then the clip can be slid rearwardly and removed from the assembly without destroying the clip.

Obviously, it is not essential that the yoke 91 be struck downwardly from the crest portion of the clip. It is also not necessary that the guide members 96 and 97 be provided. By manually depressing the forward end of the yoke 91, the fingers can be inserted under the abutment flange so long as the forward and edge portions of the yoke are severed from the clip member. However, by striking the yoke downward from the crest of the clip and further by providing the guide members 96 and 97, the assembly of the unit is made considerably easier and therefore this arrangement is utilized in my preferred embodiment.

From the foregoing, it is felt that the assembly of my improved actuator construction will be apparent but the assemblage of parts will be briefly described in connection with FIGURE 2. Therein, the valve body 10 is shown with the upstanding plunger tube assembly 23 mounted thereon in the manner previously described. The enclosing member 76 is placed tightly around the end members 66 and 67 of the bobbin 64 with the inturned flanges 80 and 81 extending inwardly along the rear end portions 70 and 71 of the bobbin. Then this assembly of the bobbin and enclosure member is slid between the legs 52 and 53 of the frame member and slid back to a point wherein the out-turned flanges 82 and 83 of the enclosure member 76 extend into the cup-shaped portion 51 of the frame member. This assembly is slid together until the inturned flanges 80 and 81 are entrapped between the rear surfaces 70 and 71 of the bobbin and the forward edges of wings 55 and 56, respectively. At this time the aperture 65 in the bobbin is aligned with the apertures 60 and 61 through the legs of the frame member. The frame member is then mounted on the plunger tube assembly with the plunger tube assembly extending through the apertures and with abutment flange 36 on the outer end of the plunger tube assembly positioned immediately above leg 52 of the frame member. Clip 84 is slid into securing engagement with the leg 52 and abutment flange 36 so that the fingers 94 and 95 thereof fit into the groove 35 and resiliently engaged the abutment flange 36 urging it in an upward direction and at the same time the base 85 of the clip bears down upon the upper surface of leg 52 so that the frame member is urged downwardly on the plunger tube assembly. As noted previously, when the clip is slid fully into place, the upper end of the plunger tube assembly extends through the opening left by the yoke 91 when it is depressed from the crest of the clip member. This locks the assembly.

It is to be understood that it is not essential that the clip 84 be formed with a circular base portion, it being essential only that the clip have a concave side facing toward the leg 52 and a convex side facing outwardly from the structure with a base bearing upon leg 52. However, it will be noted that when the clip is formed with a shape conforming to the shape of the forward end of leg 52, the clip not only secures the interlocking parts of the assembly in assembled relationship, but also adds to the aesthetic aspects of the actuator assembly. With the use of the circular based dome-shaped clip, the clip itself acts like a cover for the assembly and blends in with the other parts to give the whole assembly a finished appearance. Obviously, the clip may be finished by painting, anodizing or other means in order to give it an appearance which will be pleasing to the eye and which will blend in with the rest of the unit.

It will also be understood that the interlocking assemblage of parts, namely the plunger tube assembly 23, the frame member 50, the bobbin 64 and the enclosure member 76 can be secured by some means other than the clip 84. For example, the upper end of plunger tube assembly 23 might be threaded and a simple nut be threaded thereon and down into engagement with the upper surface of leg 52. However, the use of the clip 84 is thought to be preferable for several reasons: first, the cost of threading the upper end of the plunger tube assembly exceeds the cost of simply forming a groove therein to provide an abutment flange thereon; secondly, as is noted above, the clip itself adds to the aesthetic value of the assembly; third, the assembly can be made much more rapidly when the clip is merely slid into place and locked by its self-locking feature described above; and finally, the clip holds the assembly tightly together and will not work loose to permit vibration of the assembly (a problem which is not uncommon when A.C. current is supplied to the coil).

From the foregoing it can be seen that I have provided an improved solenoid actuator assembly comprised of a plurality of inter-locking parts, each of which is individually relatively simple to manufacture and consequently relatively inexpensive and wherein the entire plurality of parts can be quickly and easily assembled to reduce the overall cost of the unit. The structure is particularly applicable to a solenoid actuated valve as described herein but it should also be understood that the invention is not limited thereto. For example, the plunger tube assembly may be provided with an abutment surface similar to the clamping member 46 which can be adapted to be mounted upon any device to be operated by the actuator. Thus, while the invention, in one sense, lies in the combination of the improved actuator assembly with the solenoid valve, it clearly is not to be limited thereto. Further, it is to be understood that the clip 84 in and of itself provides several important features. Particularly, it is easily applied to secure a member, such as the frame member 50, onto a post-like member such as the plunger tube assembly 23 and which, when in place, provides a locking feature which prevents it from being accidentally removed. At the same time, the clip can be easily removed by lifting up on the forward portion and sliding it to the rear so the clip can be removed without destroying it, as is the case with most conventional locking clips. Therefore, this clip may find application in other areas than in the actuator assembly described herein.

Again it is emphasized that, while I have shown and described a specific preferred embodiment of my invention, various modifications thereto may become obvious to those skilled in the art in view of my disclosure herein. Therefore, my invention is to be limited solely by the scope of the appended claims.

I claim:
1. A solenoid valve assembly comprising:
a valve body;
an elongated plunger tube assembly having an inner end rigidly mounted on said body and an outer end extending away from said body, said plunger tube assembly having a transversely extending abutment flange adjacent the outer end of said plunger assembly;
a frame member formed of magnetic material and having a generally cup-shaped rear portion and first and second similar, flat, parallel legs co-extensive with said rear portion and extending forward from the open end of said cup-shaped portion on opposite sides thereof, each of said legs having a semi-circular forward portion with a center of curature located forward from the open end of said cup-shaped portion, each of said legs furthur being symmetrical about a line through said center of curvature and having opposite side edges tangent to the edge of said semi-circular portion and extending to the open end of said cup-shaped portion, each of said legs having an aperture therethrough substantially at the center of curvature of said semi-circular portion, said frame member being mounted on said body with said plunger tube assembly extending through the apertures in said legs and with said first leg abutting said body and with the abutment flange on said plunger tube assembly disposed immediately outward from said second leg;
an apertured bobbin mounted between said legs with said plunger tube extending through the aperture therein, said bobbin having an end member adjacent each of said legs, said end members having a semi-circular forward portion with a radius slightly less than the radius of the semi-circular portion of said frame and opposite side edges extending therefrom and terminating at a rear portion generally transverse to the line of symmetry of said legs and disposed slightly forward of the open end of said cup-shaped portion;
a solenoid coil on said bobbin;
an enclosure member formed of a continuous elongated strip of relatively thin material having a width substantially equal to the distance between said legs, said enclosure member being disposed between said legs and transverse thereto and surrounding the forward end and sides of said bobbin to form an enclosure substantially continuous with said cup-shaped portion of said frame member, said enclosure member having an in-turned flange on each side of said bobbin and extending between the rear portion of the end members of said bobbin and the forward end of said cup-shaped portion of said frame member, and said enclosure member having an out-turned flange on each side of said bobbin adjacent said in-turned flange and extending rearwardly on the interior of said cup-shaped portion of said frame member; and
fastening means releasably engaging said abutment flange for holding said frame member on said plunger tube assembly, said fastening means including means resiliently bearing upon said second leg and thereby urging said frame member into engagement with said body.

2. A solenoid valve assembly comprising:
a valve body;
an elongated plunger tube assembly having an inner end rigidly mounted on said body and on outer end extending away from said body, said plunger tube assembly having a transversely extending abutment flange adjacent the outer end of said plunger assembly;
a generally U-shaped frame member formed magnetic material and including first and second similar, spaced, parallel legs each having a forward edge, side edges and a rear portion, a bight portion joining the rear portions of said legs, and a forwardly struck wing on each side of said bight portion extending forward therefrom between said legs, each of said wings terminating in a forward edge intermediate the forward and rear portions of said legs so that said legs, said bight portion, and said wings collectively defined a generally cup-shaped structure substantially enclosing the rear portion of said frame member, said bight portion having an opening therein to facilitate the passage of electrical conductors therethrough, each of said legs having an aperture intermediate the forward end thereof and the forward edges of said wings, said frame member being mounted on said body with said plunger tube assembly extending through the apertures in said legs and with first leg abutting said body and with the abutment flange on said plunger tube assembly located immediately outward from said second leg;

an apertured bobbin mounted between said legs with said plunger tube extending through the aperture therein, said bobbin having an end member adjacent each of said legs, said end members having forward and side edges shaped similar to said legs but said end members being somewhat smaller than said legs and terminating in a rear portion slightly forward of the forward edge of said wings;

a solenoid coil or said bobbin;

an enclosure member formed of a continuous elongated strip of relatively thin material having a width substantially equal to the distance between said legs, said enclosure member being disposed between said legs and transverse thereto and enclosing the forward end and sides of said bobbin, said enclosure member having a pair of in-turned flanges, each of which is disposed between the forward end of one of said wings and the rear portion of the end members of said bobbin, and a pair of out-turned flanges, one adjacent each of said in-turned flanges, and each extending adjacent one of said wings on the interior of the cup-shaped rear portion of said frame; and a unitary spring clip releasably engaging said abutment flange and resiliently urging said frame member into engagement with said body.

3. A solenoid valve assembly comprising:

a valve body;

an elongated plunger tube assembly having an inner end rigidly mounted on said body and an outer end extending away from said body;

a frame member formed of magnetic material and having a generally cup-shaped rear portion and first and second similar, flat, parallel legs co-extensive with said rear portion and extending forward from the open end of said cup-shaped portion on opposite sides thereof, each of said legs having forward and side edges, each of said legs having an aperture therethrough intermediate said enclosed rear portion and said forward edge, said frame member being mounted on said body with said plunger tube assembly extending through the apertures in said legs and with said first leg abutting said body and with the outer end of said plunger tube assembly extending through said second leg;

an apertured bobbin mounted between said legs with said plunger tube extending through the aperture therein, said bobbin having an end member adjacent each of said legs, said end members having forward and side edges shaped similar to said legs but said end members being somewhat smaller than said legs and terminating in a rear portion disposed slightly forward of the open end of said cup-shaped portion;

a solenoid coil on said bobbin;

an enclosure member surrounding the forward end and sides of said bobbin to form an enclosure substantially continuous with said cup-shaped portion of said frame member, said enclosure member having an in-turned flange on each side of said bobbin and extending between the rear portion of the end members of said bobbin and the forward end of said cup-shaped portion of said frame member, and said enclosure member having an out-turned flange on each side of said bobbin adjacent said in-turned flange and extending rearward on the interior of said cup-shaped portion of said frame member; and fastening means operably connected to said outer end of said plunger tube assembly and operably associated with said second leg of the frame member to secure said frame member and thereby said bobbin and said enclosing member to said plunger tube assembly.

4. A solenoid actuator assembly comprising:

an elongated plunger tube assembly having a base providing an abutment surface and an outer end extending away from said abutment surface, said plunger tube assembly having a transversely extending abutment flange adjacent the outer end of said plunger assembly;

a frame member formed of magnetic material and having a generally cup-shaped rear portion and first and second similar, flat, parallel legs co-extensive with said rear portion and extending forward from the open end of said cup-shaped portion on opposite sides thereof, each of said legs being generally symmetrical about a line from the front to the rear thereof and having a forward edge and opposing side edges extending rearward to the open end of said cup-shaped portion, each of said legs having an aperture therethrough intermediate the forward edge thereof and the open end of said cup-shaped portion, said frame member being mounted with said plunger tube assembly extending through the apertures in said legs and with said first leg abutting said abutment surface thereon and with the abutment flange on said plunger tube assembly disposed immediately outward from said second leg;

an apertured bobbin mounted between said legs with said plunger tube extending through the aperture therein, said bobbin having an end member adjacent each of said legs, each of said end members having a forward edge and opposing side edges and being shaped similar to said legs but slightly smaller than said legs, said end members terminating in a rear portion having a surface generally transverse to the line of symmetry of said legs and disposed slightly forward of the open end of said cup-shaped portion;

a solenoid coil on said bobbin;

an enclosure member surrounding the forward end and sides of said bobbin to form an enclosure substantially continuous with said cup-shaped portion of said frame member, said enclosure member having an in-turned flange on each side of said bobbin and extending between the rear portion of the end members of said bobbin and the forward end of said cup-shaped portion of said frame member, and said enclosure member having an out-turned flange on each side of said bobbin, one adjacent each of said in-turned flanges and extending rearward on the interior of said cup-shaped portion of said frame member; and a spring clip releasably engaging said abutment flange and resiliently bearing against said second leg and urging said frame member against said base.

5. A solenoid actuator assembly comprising:

an elongated plunger tube assembly having a base providing an abutment surface and an outer end extending away from said abutment surface;

a frame member formed of magnetic material and having a generally cup-shaped rear portion and first and second similar, flat, parallel legs co-extensive with said rear portion and extending forward from the open end of said cup-shaped portion on opposite sides thereof, each of said legs having a forward edge and opposing side edges extending rearward to the open end of said cup-shaped portion, each of said legs having an aperture therethrough intermediate the forward edge thereof and the open end of said cup-shaped portion, said frame member being mounted with said plunger tube assembly extending through the apertures in said legs and with said first leg abutting said abutment surface thereon and with the outer end of said plunger tube assembly through said second leg;

an apertured bobbin mounted between said legs with said plunger tube extending through the aperture therein, said bobbin having an end member adjacent each of said legs, each of said end members having a forward edge and opposing side edges and being shaped similar to said legs but slightly smaller than said legs, said end members terminating in a rear portion having a surface generally transverse to the planes of said legs and disposed slightly forward of the open end of said cup-shaped portion;

a solenoid coil on said bobbin;

an enclosure member disposed between said legs and transverse thereto and surrounding the forward end and sides of said bobbin to form an enclosure substantially continuous with said cup-shaped portion of said frame member, said enclosure member having an in-turned flange on each side of said bobbin and extending between the rear portion of the end members of said bobbin and the forward end of said cup-shaped portion of said frame member, and said enclosure member having an out-turned flange on each side of said bobbin, one adjacent each of said in-turned flanges and extending rearward on the interior of said cup-shaped portion of said frame member; and fastening means operably connected to said outer end of said plunger tube assembly and operably associated with said second leg of the frame member to secure said frame member and thereby said bobbin and aid enclosing member to said plunger tube assembly.

6. The solenoid valve assembly of claim 3 wherein said plunger tube assembly has a transversely extending abutment flange adjacent the outer end thereof, and wherein said fastening means comprises a unitary spring clip including a generally dome-shaped member having a base portion bearing upon the outer surface of said second leg of said frame member, said dome-shaped member having forward and rear portions and a crest portion therebetween, a resilient yoke formed from the crest portion of said dome-shaped member and having a forward portion severed from said crest portion but integral with said clip adjacent the rear portion thereof, said yoke including a pair of spaced fingers surrounding the plunger tube assembly and resiliently bearing against the underside of the abutment flange thereon, the forward end of said yoke being depressable to facilitate insertion of said fingers between the outer surface of said second leg and the inner surface of the abutment flange, the opening left in the dome-shaped member by the depression of said yoke being sufficiently large so that the outer end of the plunger tube assembly extends therethrough when said clip is positioned on said assembly to render said clip removable therefrom only by lifting the forward portion of said clip to clear the plunger tube assembly and then sliding said clip rearwardly to withdraw the fingers of said yoke.

7. The solenoid valve assembly of claim 3 wherein said plunger tube assembly has a transversely extending abutment flange adjacent the outer end thereof, and wherein said fastening means comprises a unitary spring clip including a relatively thin resilient clip member having a concave side and an opposite convex side, said clip member having forward and rear edges on opposite sides of a crest portion, and having a base portion including said front and rear edges and bearing upon the outer surface of said second leg of said frame member, and a resilient yoke formed by a portion of the clip and having a forward portion severed from the clip and a rear portion integral with said clip at a point intermediate said crest and said rear edge, the forward portion of said yoke being depressable, said yoke further having a portion removed to define an opening through which the outer end of the plunger tube assembly extends and to define a pair of spaced and forwardly extending fingers which engage the inner surface of said abutment flange so that said clip urges the frame member, and thereby the bobbin, the coil and the enclosure member, inwardly toward the valve body.

References Cited by the Examiner
UNITED STATES PATENTS 3,036,246    5/1962    Valleau _____ 317—158

BERNARD A. GILHEANY, *Examiner.*

H. A. LEWITTER, *Assistant Examiner.*